US006816264B1

(12) United States Patent
Dobbs (10) Patent No.: US 6,816,264 B1
(45) Date of Patent: Nov. 9, 2004

(54) SYSTEMS AND METHODS FOR AMPLIFIED OPTICAL METROLOGY

(75) Inventor: Michael E. Dobbs, Fort Wayne, IN (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 249 days.

(21) Appl. No.: 10/024,554

(22) Filed: Dec. 21, 2001

(51) Int. Cl.[7] .............................................. G01B 9/02
(52) U.S. Cl. .................................... 356/451; 356/498
(58) Field of Search ................................ 356/451, 486, 356/487, 493, 497, 498, 500

(56) References Cited

U.S. PATENT DOCUMENTS

| 4,413,905 A | * 11/1983 | Holzapfel | 356/5.1 |
|---|---|---|---|
| 5,396,328 A | 3/1995 | Jestel et al. | |
| 5,757,488 A | * 5/1998 | Melton et al. | 356/451 |

FOREIGN PATENT DOCUMENTS

EP    0 843 152 A2    5/1998

OTHER PUBLICATIONS

European Serach Report for Application No. EP 02 02 7222 dated May 6, 2004.
Bobroff, N.: "Recent Advances in Displacement Measuring Interferometry", Measurement Science and Technology, IOP Publishing, Bristol, GB, vol. 4, No. 9, Sep. 1, 1993, pp. 907–926.
Prunet S. et al.: "Exact Calculation of the Optical Path Difference and Description of a New Birefringent Interferometer" Optical Engineering, Soc. of Photo–Optical Instrumentation Engineers. Bellingham, U.S., vol. 38, No. 6, Jun. 1999, pp. 983–989.

* cited by examiner

Primary Examiner—Samuel A. Turner
Assistant Examiner—Patrick Connolly
(74) Attorney, Agent, or Firm—RatnerPrestia (57) ABSTRACT

A spectrometer may include a radiant source configured to emit radiation and an optical amplifier configured to amply the radiation emitted by the radiant source to produce amplified radiation. A number of optical elements may be configured to produce an interference pattern from the amplified radiation. A detector may detect the interference pattern and generate data from the interference pattern. A processor may be configured to measure one or more from the data.

22 Claims, 6 Drawing Sheets

| | | Lamp Type | | | |
|---|---|---|---|---|---|
| Hg(Ar) | Hg(Ne) | Xenon | Argon | Neon | Krypton |
| | | Wavelength (nm) | | | |
| 302.2 | 404.66 | 473.4 | 696.54 | 621.73 | 473.9 |
| 312.57 | 435.84 | 480.7 | 738.40 | 626.65 | 476.6 |
| 313.15 | 546.07 | 483.0 | 750.39 | 630.48 | 483.2 |
| 313.18 | 576.96 | 508.1 | 751.47 | 633.44 | 557.0 |
| 320.8 | 579.07 | 529.2 | 763.51 | 638.30 | 587.1 |
| 326.4 | 614.31 | 531.4 | 772.38 | 640.11 | 758.74 |
| 345.2 | 638.30 | 554.0 | 772.42 | 640.22 | 760.15 |
| 365.02 | 640.11 | 541.9 | 794.82 | 650.65 | 769.45 |
| 404.66 | 640.22 | 547.2 | 801.48 | 653.29 | 769.45 |
| 435.84 | 650.65 | 597.7 | 811.53 | 659.90 | 785.48 |
| 546.07 | 703.24 | 603.6 | 826.45 | 660.29 | 805.95 |
| 576.96 | 1013.98 | 605.1 | 840.82 | 667.83 | 810.44 |
| 579.07 | 1128.74 | 609.8 | 842.46 | 671.70 | 811.29 |
| 615.0 | 1357.02 | 659.5 | 912.3 | 692.95 | 819.00 |
| 1014.0 | 1367.35 | 680.5 | 922.4 | 703.24 | 826.32 |
| 1357.0 | 1529.58 | 699.1 | 965.8 | 717.39 | 829.81 |
| 1692.0 | 1688.15 | 823.2 | 1047.1 | 724.52 | 829.81 |
| 1707.3 | 1692.02 | 828.0 | 1331.3 | 743.89 | 850.9 |
| 1711.0 | 1694.20 | 834.7 | 1336.7 | 783.9 | 877.7 |
| | 1707.28 | 840.9 | 1371.8 | 792.7 | 829.9 |
| | 1710.99 | 881.9 | 1694.0 | 793.7 | 975.2 |
| | 1732.94 | 895.2 | | 794.3 | 1363.4 |
| | 1813.04 | 980.0 | | 808.2 | 1442.7 |
| | 1970.02 | 992.3 | | 811.9 | 1523.9 |
| | | 1262.3 | | 812.9 | 1533.4 |
| | | 1365.7 | | 813.6 | 1678.51 |
| | | 1473.3 | | 825.9 | 1689.04 |
| | | 1541.8 | | 826.6 | 1689.68 |
| | | 1672.8 | | 826.7 | 1693.58 |
| | | 1732.5 | | 830.0 | 1816.73 |
| | | 2026.2 | | 836.6 | |
| | | | | 953.4 | |
| | | | | 1056.2 | |
| | | | | 1079.8 | |
| | | | | 1084.5 | |
| | | | | 1114.3 | |

SYSTEMS AND METHODS FOR AMPLIFIED OPTICAL METROLOGY

BACKGROUND OF THE INVENTION

1. Field of the Invention

This invention relates to spectrometers and, more particularly, to measurements (i.e., metrology) within spectrometers.

2. Description of Related Art

A spectrometer may be considered as an instrument for measuring the positions of spectral lines (e.g., isolated peaks of intensity) in a spectrum of radiation. Spectrometers may be utilized in land, sea, air, and space-based configurations to measure radiance from a source or a field of view in many different spectral channels (i.e., bands within a wavelength region). Typically, a larger number of spectral channels is desirable, because more precision and information about a given spectrum may be obtained. For example, it may be desirable to have tens, or hundreds, or thousands of channels within a given wavelength region (i.e., 8–12 $\mu$m, known as the long wave infrared (LWIR) region).

One exemplary type of spectrometer is a Fourier transform infrared (FTIR) spectrometer based on a Michelson interferometer configuration. The Michelson interferometer may be utilized for precise measurements of wavelength or energy distribution in a heterogenous beam of radiation based on an interference pattern. The principles of Michelson two beam interferometry may be utilized for spectroscopy, for example, in the infrared wavelength region. In Michelson spectroscopy use, the large luminosity of the Michelson-based interferometer may be advantageously combined with a photographic spectrograph to simultaneously observe an entire spectrum. The Michelson FTIR spectrometer detects and records a Fourier transform of the desired spectrum, which may be obtained by an inverse transform.

In the Michelson FTIR spectrometer, a laser is typically used as a metrology source for the spectrometer. Such a metrology source may be thought of as a source of radiation that is used in calibrating and ensuring accuracy of the spectrometer. Knowledge of the exact wavelength of the laser source permits proper scaling of infrared power spectral density (IR PSD) data obtained by the FTIR spectrometer. Different approaches may be taken to measure the wavelength of the metrology laser.

One method is to use the IR PSD and to look for the presence of spectral lines of known gas lines. With knowledge of the wavelength for these known gas lines, it is possible to deduct the wavelength of the metrology laser and to calculate the IR PSD. The resolution attainable with this measurement approach is dependent on the gas pressure and the resolution of the instrument. In some field situations, this approach is not suitable. Another approach employs making a calibration measurement using the spectrometer. Using a pointing mirror and by looking into a gas cell or at a lamp (e.g., a neon lamp), the acquired spectrum can be used to deduct the wavelength of the metrology laser and used to calibrate subsequent measurements. However, this approach requires the presence of a gas cell or lamp external to the spectrometer, which may not always be feasible.

Thus, there is a need in the art to accurately calibrate spectrometers utilizing metrology sources that do not unduly add to the complexity of the spectrometers.

SUMMARY OF THE INVENTION

Systems and processes consistent with the principles of the invention may, among other things, allow precise measurement of lengths and calibration of spectral data obtained from interferometers and spectrometers using an amplified metrology source.

In accordance with one purpose of the invention as embodied and broadly described herein, a method for measuring length in an interferometer may include generating radiation having a known wavelength profile and amplifying the radiation to produce amplified radiation. The method may also include producing an interference pattern and measuring the interference pattern. One or more lengths within the interferometer may be calculated using the measured interference pattern.

In another implementation consistent with principles of the invention, a device may include a radiant source configured to emit radiation and an optical amplifier configured to amply the radiation emitted by the radiant source to produce amplified radiation. At least two it optical elements may be configured to produce an interference pattern from the amplified radiation. A detector may detect the interference pattern and generate data from the interference pattern. A processor may be configured to measure one or more lengths from the data.

In a further implementation consistent with principles of the invention, a method for determining a length in a spectrometer may include generating radiation including a precisely known wavelength and amplifying the radiation to produce amplified radiation. An interference pattern may be created from the amplified radiation. A precision available for a length measurement may be increased. The interference pattern may be detected. The length measurement may be performed from the detected interference pattern.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

As described herein, in one implementation, an amplified spectral source may be used to generate a high magnitude signal whose spectral characteristics are precisely known. An interferogram generated from this signal may be utilized to calibrate data generated from the spectrometer that generated the interferogram.

EXEMPLARY DEVICE

Although the present invention can be used in many different applications where interferometric based spectral measurements are useful, one embodiment of the present invention may be utilized in space-based spectral scanning applications.

Figure 1:
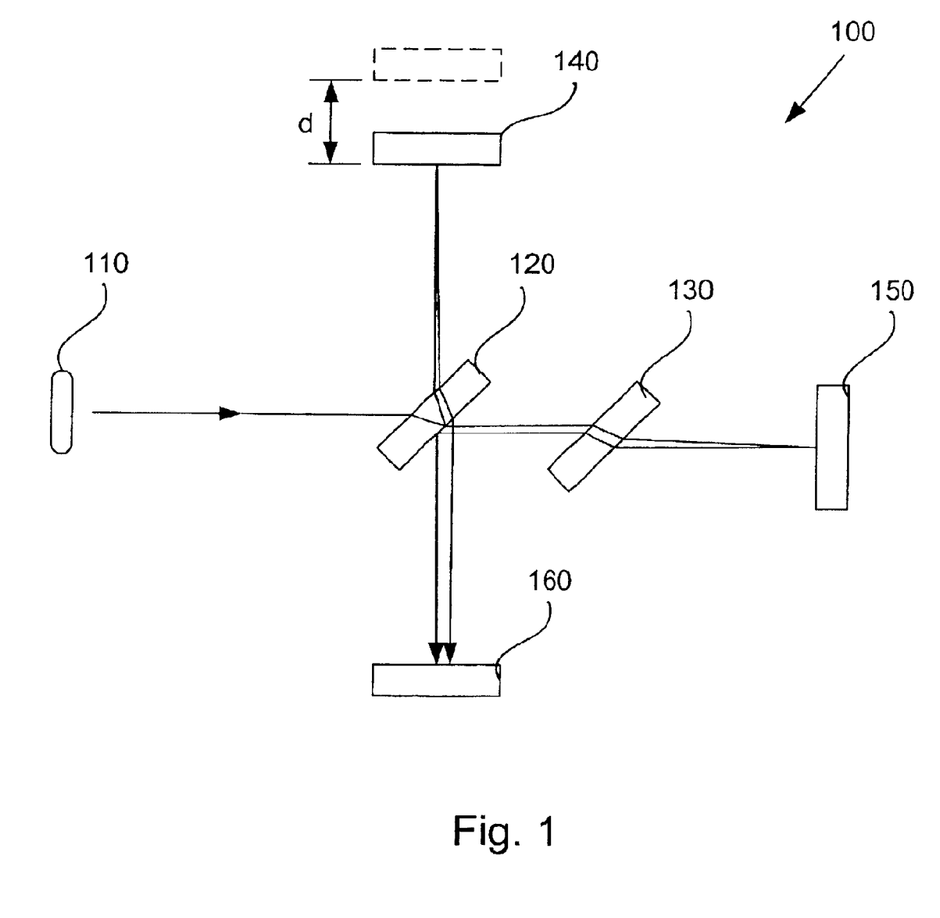
FIG. 1 is a schematic diagram of a Michelson-based interferometer for measuring the wavelength of radiation.

FIG. 1 is a schematic diagram of a Michelson-based interferometer system 100 for *m measuring the wavelength of emitted or reflected radiation. The interferometer system 100 may include a radiation source 110, a semi-silvered flat mirror 120, a compensating plate 130, a first flat mirror 140, a second flat mirror 150, and a radiation detector 160. The interferometer portion of the interferometer system 100 may include all elements (120–160) except the radiation source 110. In one implementation consistent with the present invention, the radiation may include infrared light.

A light beam from the radiation source 110 may be split by the semi-silvered flat mirror 120 at an angle of 45 degrees with respect to the beam into two beams that are normal to one another. The direct (i.e., not reflected or bent) beam passes through a compensating plate 130 that is parallel to the semi-silvered flat mirror 120. The direct beam may reflected back to semi-silvered mirror 120 by the second flat mirror 150. Similarly, the "bent" beam that is reflected 90 degrees from its original path may be reflected by the first flat mirror 140. The first flat mirror 140 may be configured to move a distance d in the direction of the bent light beam, thereby varying a length of the bent beam's optical path.

The reflected bent and direct beams may interfere when combined by the semi-silvered flat mirror 120. If the two optical paths are nearly equal, interference fringes may be observed. The greater the difference of the paths, the more nearly monochromatic the light must be for observing any fringes. The fringes may shift due to the displacement of the first mirror 140 in time. The path difference between successive bright fringes may be $\lambda/2$, where $\lambda$ is the wavelength of the light source, and the passage of one bright fringe to a position previously occupied by an adjacent fringe implies the translation of the first mirror 140 by a distance of $\lambda/4$. Hence, path differences and distances within the spectrometer may be determined from the fringe patterns.

In one implementation consistent with the present invention, the interferometer arrangement 100 may utilize corner-cube reflectors for mirrors 140 and 150. Mirror 140 may be moved slowly along the optical axis at a constant rate, and an aperture (not shown) may be used with the source 110. The photodetector 160 may include an array of detector elements, and may be configured to record the Fourier transform of the spectrun of light emitted from the source 110 as a function of time.

Figure 2:
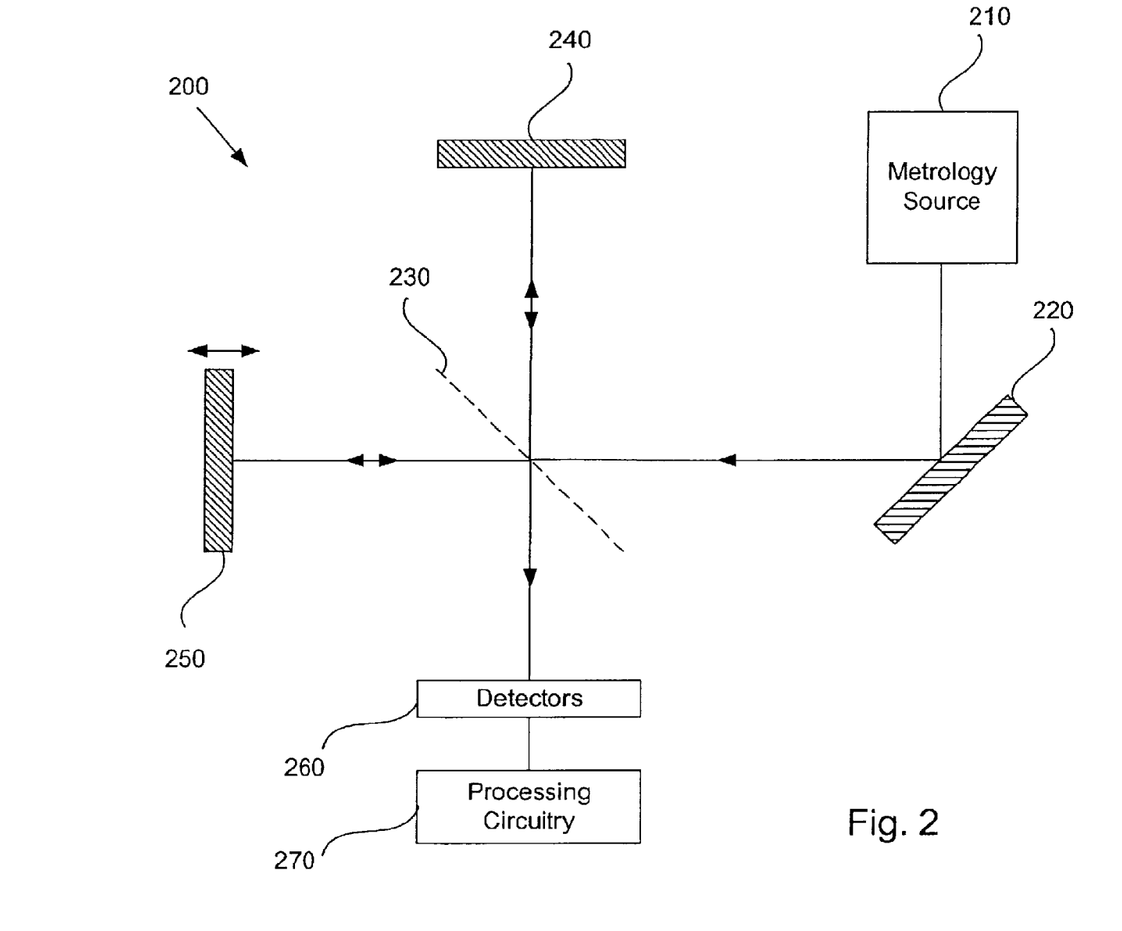
FIG. 2 is a schematic diagram of an Fourier transform spectrometer (FTS) according to an implementation consistent with the present invention with a metrology source to provide radiation for wavelength measurement and calibration.

FIG. 2 is a schematic diagram of an Fourier transform spectrometer (FTS) 200 according to an implementation consistent with the present invention. The spectrometer 200 may include a metrology source 210, a directional mirror 220, a beam splitter 230, a stationary mirror 240, a moving mirror 250, detectors 260, and processing circuitry 270. The metrology source 210 may be configured to generate radiant energy (e.g., light). As described below, the metrology source 210 may be configured to emit high-power radiation with a precise wavelength that is suitable for measurements within the spectrometer 200.

The directional mirror 220 may include one or more mirrors arranged to direct radiation from the source 210 to the beam splitter 230. In an alternate implementation consistent with the invention, the radiation source 210 may emit radiation directly to the beam splitter 230, removing the need for the directional mirror 220.

The beam splitter 230 may be configured to create two orthogonal optical paths for incident radiation. The beam splitter 230 may include a partially reflective mirror, or an optical grating. Incident radiation may be split by beam splitter 230 into a first beam that strikes the moving mirror 250 and returns along substantially the same path, and a second beam that strikes stationary mirror 240 and returns along substantially the same path. The beam splitter 230 may combine the two beams returning from mirrors 240 and 250, producing an interference pattern. Moving mirror 250 may be configured to move along the optical axis of its incident radiation. The moving mirror 250 may be moved by an actuator (not shown), such as an electric motor.

The detectors 260 may include a two dimensional array of detector elements that are configured to detect an impinging interference pattern from the beam splitter 230 and convert it into electrical signals. The detecting elements may be constructed of materials (e.g., Si, Ga:Si, InSb, etc.) that are sensitive in a certain wavelength region, such as visible, near infrared, mid infrared, or far infrared regions. The combined beams of radiation from the beam splitter 230 may destructively interfere at some points which appear dark, and constructively interfere at other points which appear bright. These interference patterns may be sensed by the detectors 260 to facilitate production of the interferograms. In addition to radiation from the metrology source 210, the detectors may detect radiation from a radiation source of interest (e.g., radiation source 110 or another observable object).

The processing circuitry 270 may include circuitry and/or software for calibration and for automatically tracking fringe counts, The processing circuitry may include a general purpose processor to process the raw spectral data produced by the detectors 260. Alternately, the processing circuitry 270 may include a zero crossing detector to count fringes and determine optical path differences. In other implementations consistent with the present invention, the processing circuitry 270 may include a phase-locked loop (PLL) to measure path differences. The PLL may interpolate between zero crossings to increase the precision of the path difference (i.e., distance) measurement by 2, 4, 8, 16, 32, 64, etc. The PLL, however, requires a stronger optical signal than a zero crossing detector. Thus, the metrology source 210 may include an amplifier if a PLL is used.

Figure 3:
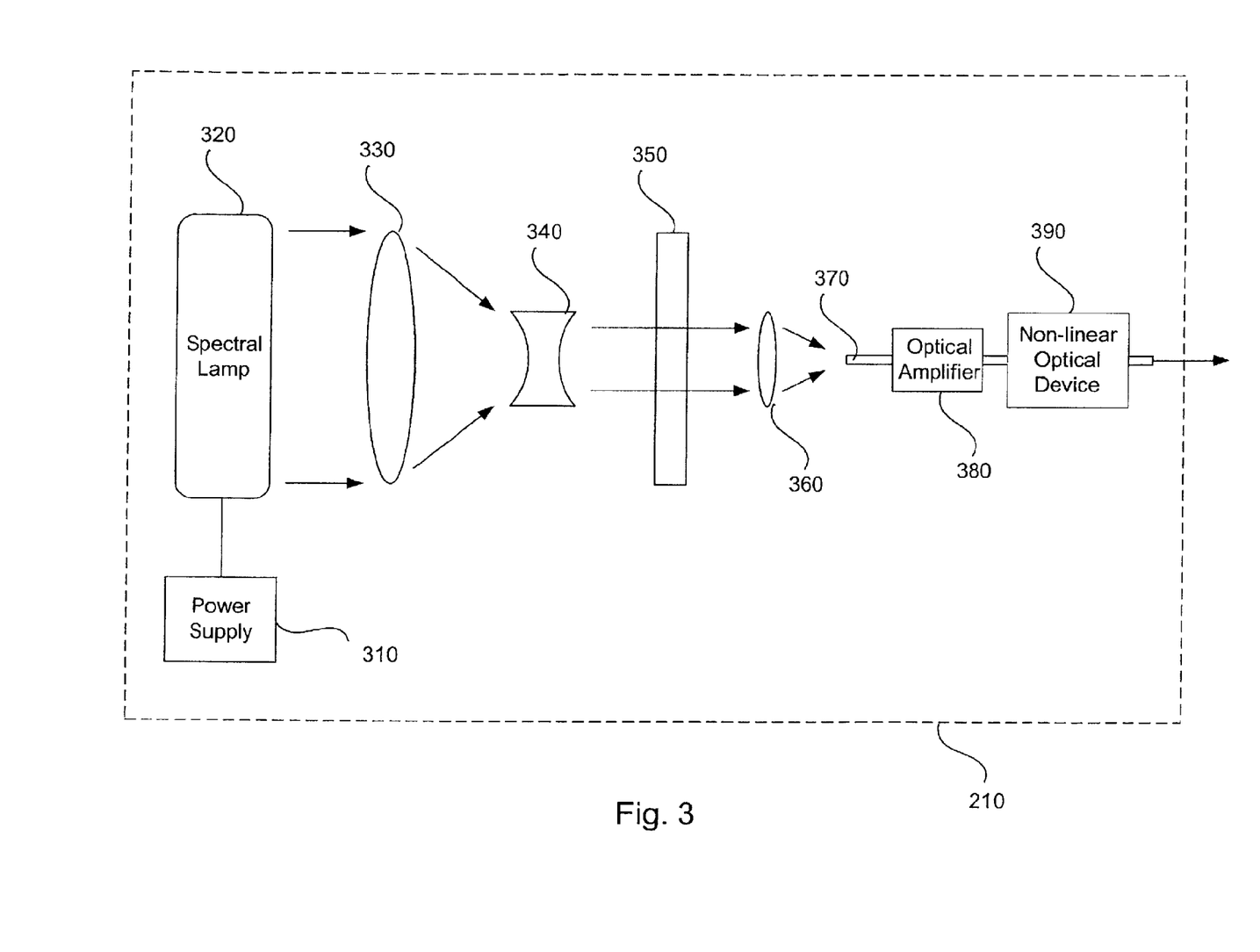
FIG. 3 is a schematic diagram of the metrology source of FIG. 2 according to one implementation consistent with the present invention.

FIG. 3 is a schematic diagram of the metrology source 210 according to one implementation consistent with the present invention. The metrology source 210 may include a power supply 310, a spectral lamp 320, a first focusing lens 330, a collimating lens 340, a filter 350, a second focusing lens 360, an input optical fiber 370, and an optical amplifier 380. The metrology source 210 may also optionally include a non-linear optical (NLO) device 390. The power supply 310 may include a known electrical supply designed to power a spectral lamp. The power supply 310 may include, for example, a battery or other power source and a voltage converter for producing a suitable voltage for the spectral lamp 320.

The spectral lamp 320 may be configured to produce noncoherent light having a well defined and known wavelength spectrum. One example of the spectral lamp 320 may include a gas discharge lamp, such as a neon lamp, that produces numerous spectral lines that can be utilized for calibration. The neon lamp, for example, may produce a spectral line with relatively strong output power at 703 nanometers. However, the neon lamp may produce other spectral lines which may be used in lieu of the spectral line at 703 nanometers (e.g., spectral lines with sufficient power output at approximately 633 nanometers and 725 nanometers). Another example of the spectral lamp 320 includes a gas absorption cell.

The first focusing lens 330 may collect available light from the spectral source 320 and concentrate the light over a smaller area, such as the face of the collimating lens 340. The collimating lens 340 may be configured to redirect the converging beam from the first focusing lens 330 and output a collimated beam having substantially parallel rays. The filter 350 may include a narrowband spectral filter configured to pass only a narrow band of wavelengths. For example, the filter 350 may be designed to exclude wavelengths other than 703 nanometers. Other center-band, or pass-band, wavelengths are possible for the filter 350, and may be chosen by one skilled in the art based on the wavelength characteristics of the spectral lamp 320.

The second focusing lens 360 may be used to couple the collimated, filtered light from the filter 350 into the input optical fiber 370. Alternately, the input optical fiber 370 may include a tapered end which obviates the need for the second focusing lens 360. The input optical fiber 370 lay include a single mode optical fiber configured to optically couple radiation into the optical amplifier 380.

Figure 6:
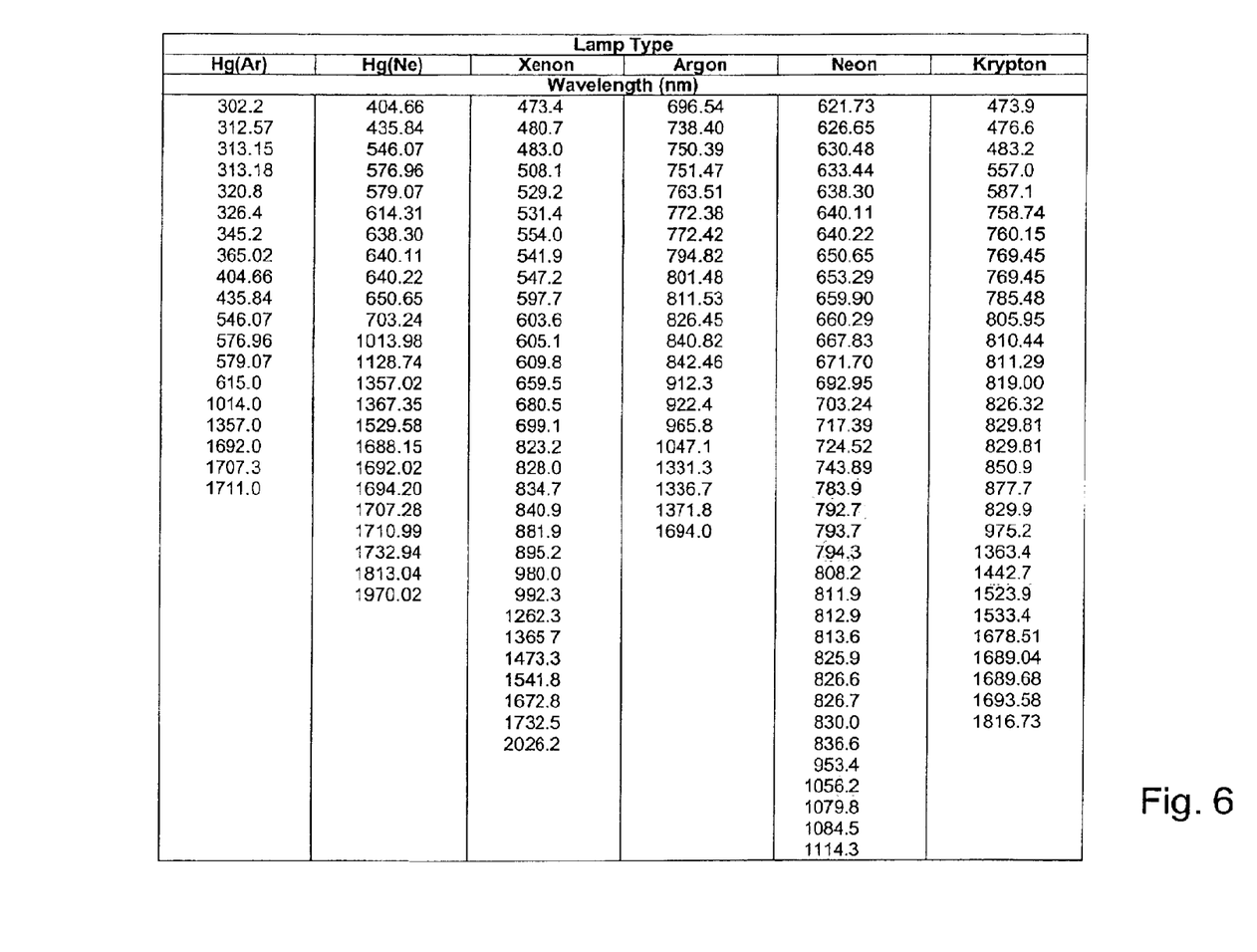
FIG. 6 is a table illustrating wavelengths obtainable from gas lamps and representative wavelengths which may be amplified.

The optical amplifier 380 may include an erbium doped fiber amplifier (EDFA) or a semiconductor optical amplifier (SOA) that is configured to impart a gain to an input optical signal. The optical amplifier 380 may impart a gain of 20–40 dB (e.g., 36 dB) to the input optical signal, and may be configured to operate over a band of wavelengths that encompasses the wavelength range passed by the filter 350. Optical amplifiers 380 may be available in certain wavelength regions. FIG. 6, for example, is a table illustrating wavelengths which may be obtained from different types of spectral lamps 320. The highlighted wavelengths within FIG. 6 may be amplified by readily available optical amplifiers 380.

The metrology source may optionally include the NLO device 390, which is configured to generate one or more harmonic multiples of an input optical signal. If the input signal, for example, has a wavelength of $\lambda$, the NLO device 390 may produce a signal with a wavelength of $\lambda/2$, $\lambda/4$, etc. Alternately, the NLO device 390 may be configured to produce new lines at multiples of the input wavelength (e.g., wavelengths of $2\lambda$, $4\lambda$, etc.). Such NLO devices typically require a relatively strong optical signal, so the NLO device 390 is placed after the optical amplifier 380.

An output fiber may be configured to optically couple the amplified (and possibly harmonically altered) optical signal to the beam splitter 230. The output optical fiber may include one or more lenses (not shown) to accomplish this task.

Figure 4:
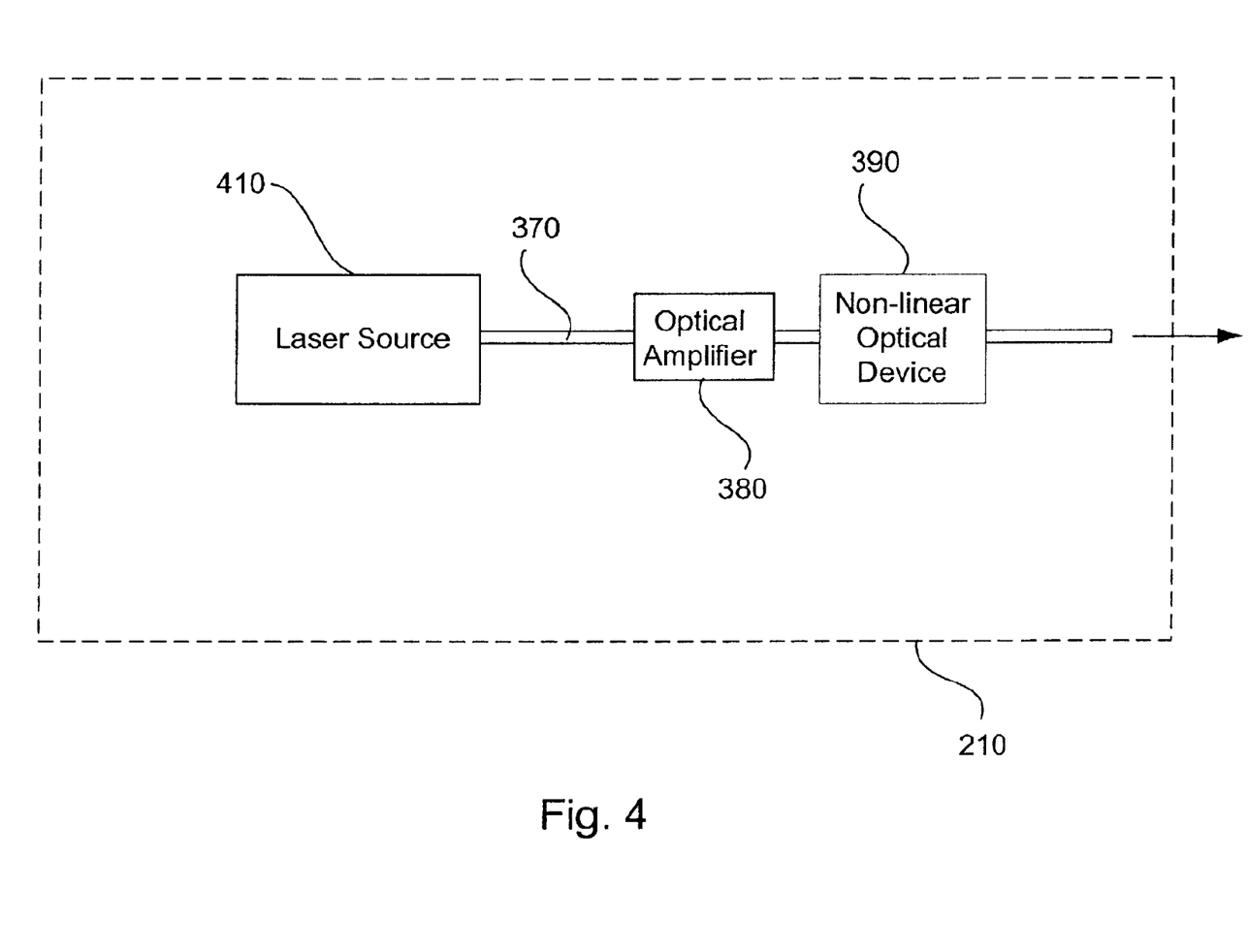
FIG. 4 is a schematic diagram of the metrology source of FIG. 2 according to another implementation consistent with the present invention.

FIG. 4 is a schematic diagram of the metrology source 210 according to another implementation consistent with the present invention. As illustrated, the metrology source 210 includes a laser source 410, an input optical fiber 370, an optical amplifier 380, and an optional NLO device 390. The input optical fiber 370, the optical amplifier 380, and the optional NLO device 390 may be configured as previously described, and will not be further discussed here.

The laser source 410 may be configured to produce coherent light having a well defined and known wavelength. One example of the laser source 410 may include a distributed feedback (DFB) laser diode. The DFB laser diode 410 may include a grating (not shown) at one end of a resonator to make one mode oscillate more strongly than others. The spacing of the grating may be chosen to distribute the feedback in both directions, thereby creating a condition that approaches single mode oscillation. In addition, the distributed feedback laser diode 410 may include optical feedback and temperature control elements to produce a single mode coherent beam whose wavelength is precisely known and does not drift with time. Thus, the distributed feedback laser diode 410 in conjunction with the optical amplifier 380 may produce a relatively high power, low drift coherent signal whose wavelength is known to a high precision. Other examples of the laser source 410 include lasers, fiber lasers, and distributed Bragg reflector (DBR) sources.

DEVICE OPERATION

Figure 5:
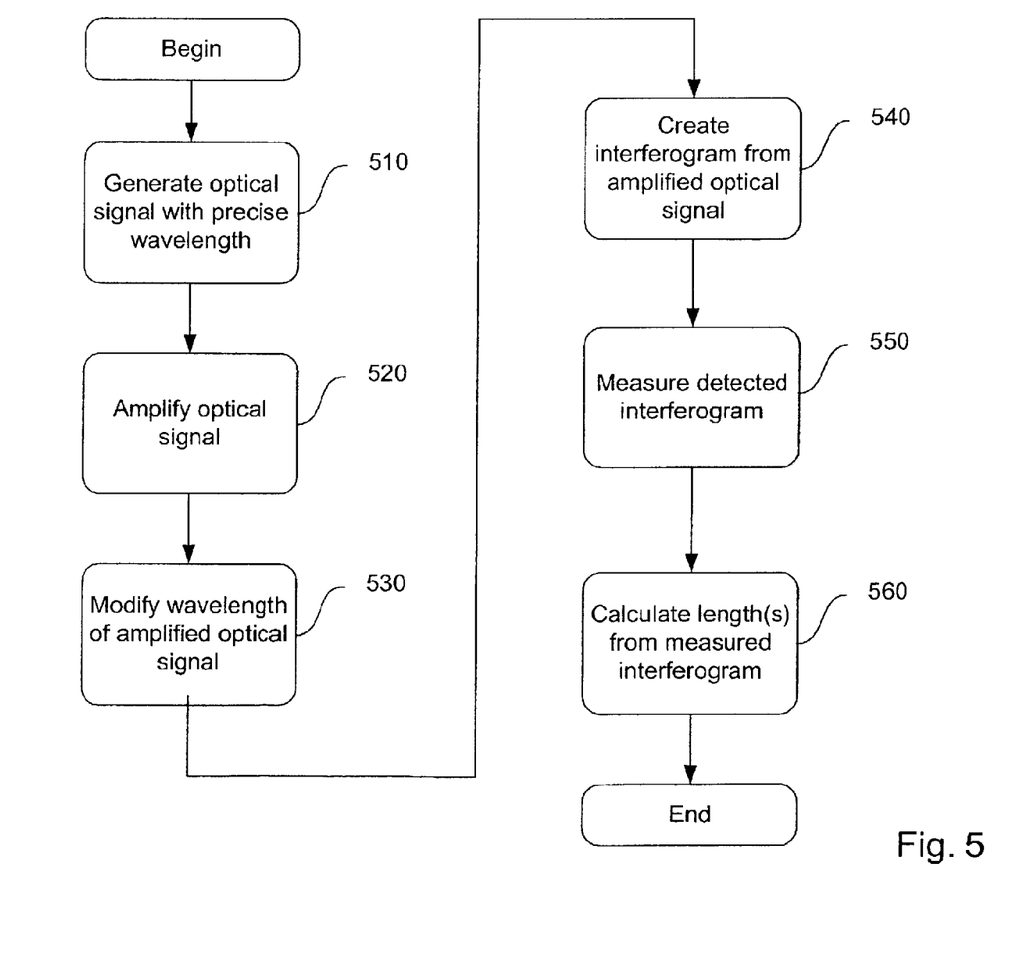
FIG. 5 is a flow chart illustrating operation of the FTIR spectrometer of FIG. 2 in an implementation consistent with the present invention.

FIG. 5 is a flow chart illustrating exemplary operation of the spectrometer 200. Operation may begin with the generating portion of the metrology source 210 generating an optical signal with a precise wavelength [act 510]. As explained earlier, this may be accomplished via filtering a broad spectral source or by generating a single mode coherent beam of light. An optical amplifier 380 may then amplify the generated optical signal to increase its optical power [act 520]. Such amplification allows a lower power signal generator to be utilized within the metrology source 210, while still producing a signal having a high enough power to be useful.

The NLO device 390, if present, may change the wavelength of the amplified optical signal to a harmonic fraction of the wavelength (e.g., the wavelength divided by two, four, etc.) [act 530]. Decreasing the wavelength of the metrology source 210 in this manner may provide a more precise measurement of distances (e.g., optical path differences) in the spectrometer 200.

Operation may continue with the mirrors 240 and 250, in conjunction with the beam splitter 230, creating an interferogram from the amplified optical signal [act 540]. Due to the high power optical signal, the fringes of the interferogram may be distinctly seen and easily resolved by detectors 260.

After detection of the interferogram and conversion into electrical signals by the detectors 260, the interferogram signals may be measured by the processing circuitry 270 [act 550]. The processing circuitry 270 may include a zero crossing detector to determine a number or spacing of fringes. As previously explained, the processing circuitry 270 may include a phase-locked loop (PLL) to make such measurements with greater precision. However, PLLs typically need a strong signal (e.g., from amplifier 380) to work properly. Such PLLs may increase the precision of the fringe measurements by 64 times or more.

Using the interferogram measurements, lengths within the spectrometer 200 (e.g., path lengths or path differences) may be calculated using techniques known in the spectrometer art [act 560]. Such path differences, for example, should be calculated based on samples finer than half of the shortest wavelength to be measured by the spectrometer. For example, if an FTS has a shortest wavelength (e.g., determined by the sensitivity of its detector array) of 2 $\mu$m, it should sample the interferogram at 1 $\mu$m or shorter intervals. As explained above, a high signal strength (e.g., signal to noise ratio (SNR)) may facilitate techniques (e.g., using a PLL, using an NLO device, or both) for increasing the precision of metrology measurements. Thus, it is desirable to use the optical amplifier 380 to amplify typically weak signal sources (e.g., spectral lamp 320 or laser source 410) in the metrology source 210.

The spectrometer 200 may be calibrated utilizing the calculated lengths. For example, because the wavelength of the light from the source 210 is known with precision, the calculated lengths in act 560 may be utilized to calibrate a wavenumber scale for measurement of power spectrum density data taken during normal operation of the spectrometer. Also, the fringe measurements may be used to precisely calculate an amount of movement of the moving mirror 250 using techniques that are known in the FTS art.

For example, in an PTS based on the Michelson interferometer, a laser 410 may be used as the metrology source 210. The known wavelength of the metrology laser 410 may be used to calibrate the scale of the infrared (IR) power spectral density (PSD) produced by the FTIR spectrometer. The laser-based interferometer produces a sinusoidal signal that is used when sampling IR interferograms produced by the interferometer. The sampling period is given by $\lambda$, where $\lambda$ is the laser's wavelength. The power spectrum density of the IR signal may be obtained from the Fourier transform of the sampled interferogram. The wavenumber scaling for the power spectrum density may be calculated from the laser wavelength $\lambda$.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although described in the context of interferometers and spectrometers, the methods described herein also may be practiced in various spectrometers (e.g., Sagnac), spectroscopes, optical encoders, long baseline interferometers, multiple aperture phased array telescopes, and active wavefront compensation systems. Further, the present invention is not limited to the numerical examples described above, nor to the present range of operating wavelengths of EDFAs, SOAs, etc. Also, although an optical filter has been described, the present invention is not limited to a single spectral feature, because optical amplifiers are capable of simultaneously amplifying many different wavelengths. Accordingly, it is contemplated that more than one amplified spectral feature may be used for calibration of spectral data.

Further, the acts in FIG. 5 need not be implemented in the order shown. For example, non-dependent acts may be performed in parallel. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed:

1. A method for measuring length in an interferometer, comprising:
   generating a single radiant source configured to emit radiation as a metrology source having a known wavelength profile of a spectral lamp;
   amplifying the radiation from the single radiant source of the known wavelength profile to produce amplified radiation;
   filtering the amplified radiation to pass a predetermined wavelength of the known wavelength profile:
   producing an interference pattern from the predetermined wavelength;
   measuring the interference pattern; and
   calculating one or more lengths within the interferometer using the measured interference pattern.

2. The method of claim 1, wherein said generating includes:
   emitting noncoherent radiation, and
   focusing the noncoherent radiation.

3. The method of claim 2, wherein said generating further includes:
   filtering the noncoherent radiation to obtain wavelengths within a spectral band.

4. The method of claim 1, wherein said amplifying includes:
   increasing a magnitude of the radiation by at least 20 dB.

5. The method of claim 1, further comprising:
   adjusting a wavelength scale for measurement of spectral data taken during normal operation of the interferometer.

6. The method of claim 1, wherein said calculating includes:
   calculating an amount of movement by a mirror within the interferometer.

7. The method of claim 1, further comprising:
   decreasing a wavelength of the amplified radiation.

8. The method of claim 1, wherein said calculating includes:
   interpolating between zero crossings of the interference pattern.

9. A device for calibrating a spectrometer comprising:
   a single radiant source configured to emit radiation as a metrology source, the radiant source being a spectral lamp having a known wavelength profile;
   an optical amplifier configured to amplify the radiation emitted by the single radiant source to produce amplified radiation of the wavelength profile;
   at least two optical elements configured to produce an interference pattern from the amplified radiation of the single radiant source;
   a detector configured to detect the interference pattern and to generate data therefrom;
   a processor configured to measure one or more lengths from the data; and
   a filter configured to pass a predetermined wavelength of the wavelength profile of the amplified radiation, and
   a spectrometer for receiving only the filtered predetermined wavelength for calibration.

10. The device of claim 9, wherein the radiant source includes:
    a gas discharge lamp.

11. The device of claim 10, wherein the radiant source further includes:
    at least one lens configured to deliver the radiation from the gas discharge lamp to the optical amplifier, and
    an optical filter configured to pass a narrow spectral band of the radiation.

12. The device of claim 9, wherein the optical amplifier includes:
    an erbium doped fiber amplifier.

13. The device of claim 9, wherein the optical amplifier includes:

a semiconductor optical amplifier.

14. The device of claim 9, wherein the at least two optical elements include:

a movable mirror configured to vary a length of an optical path and change the interference pattern.

15. The device of claim 14, wherein the processor is configured to calculate the length of the optical path using the data.

16. The device of claim 9, further comprising:

a nonlinear optical device configured to decrease a wavelength of the amplified radiation.

17. The device of claim 9, wherein the processor includes:

a phase-locked loop circuit.

18. A method for determining a length in a spectrometer, comprising:

generating a single radiant source configured to emit radiation as a metrology source including a precisely known wavelength profile of a spectral lamp;

amplifying the radiation from the single radiant source of the known wavelength profile to produce amplified radiation;

filtering the amplified radiation to pass a predetermined wavelength of the known wavelength profile;

creating an interference pattern from the predetermined wavelength;

increasing a precision available for a length measurement;

detecting the interference pattern; and performing the length measurement from the detected Interference pattern.

19. The method of claim 18, further comprising:

calibrating data obtained with the spectrometer using the length measurement.

20. The method of claim 18, wherein said increasing includes:

changing a wavelength of the amplified radiation.

21. The method of claim 18, wherein said increasing includes:

interpolating between zero crossings of the interference pattern.

22.The method of claim 21, wherein said increasing further includes:

of the amplified radiation.

* * * * *